United States Patent
Rácz et al.

(10) Patent No.: US 8,787,901 B2
(45) Date of Patent: Jul. 22, 2014

(54) METHOD, APPARATUS AND SYSTEM FOR FLEXIBLE USER TRACING IN MOBILE NETWORKS

(75) Inventors: András Rácz, Budapest (HU); Tamás Borsos, Budapest (HU); László Kovács, Martonvásár (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/899,017

(22) Filed: Oct. 6, 2010

(65) Prior Publication Data

US 2012/0089876 A1  Apr. 12, 2012

(51) Int. Cl.
*H04W 24/00* (2009.01)

(52) U.S. Cl.
USPC .......................................... 455/423; 455/425

(58) Field of Classification Search
USPC ............... 455/423, 425, 561, 422.1; 370/328, 370/252; 714/45, E11.189; 717/128
See application file for complete search history.

(56) References Cited

U.S. PATENT DOCUMENTS

| | | | |
|---|---|---|---|
| 2007/0226701 A1* | 9/2007 | Suonvieri et al. | 717/128 |
| 2010/0067495 A1* | 3/2010 | Lee et al. | 370/335 |

OTHER PUBLICATIONS

3GPP TS 32.421 V9.1.0; 3rd Generation Partnership Project; Technical Specification Group Services and System Aspects; Telecommunication management; Subscriber and equipment trace: Trace concepts and requirements (Release 9), Mar. 2010 (33 pages).

3GPP TS 32.422 V9.0.1; 3rd Generation Partnership Project; Technical Specification Group Services and System Aspects; Telecommunication management; Subscriber and equipment trace; Trace control and configuration management (Release 9), Jan. 2010 (82 pages).

3GPP TS 32.423 V9.2.0; 3rd Generation Partnership Project; Technical Specification Group Services and System Aspects; Telecommunication management; Subscriber and equipment trace: Trace data definition and management (Release 9), Mar. 2010 (71 pages).

* cited by examiner

*Primary Examiner* — Kwasi Karikari
*Assistant Examiner* — Alexander Yi
(74) *Attorney, Agent, or Firm* — Nixon & Vanderhye, P.C.

(57) ABSTRACT

In existing mobile networks, users may be traced to troubleshoot problematic user connections, monitor generic network performance, and to perform root cause analysis to identify network problems. However, the existing tracing methods provide incomplete trace information. To address this and other issues, early tracing recording is enabled in which an involved trace entity starts recording the trace data when any initial activity related to the user equipment is detected. The trace entity can continue the trace if a trace trigger is later confirmed or may discard the trace data if the trigger is not confirmed.

50 Claims, 8 Drawing Sheets

METHOD, APPARATUS AND SYSTEM FOR FLEXIBLE USER TRACING IN MOBILE NETWORKS

TECHNICAL FIELD

Technical field of present disclosure relates to method, apparatuses and systems for flexible user tracing in mobile networks, and in particular to enable early trace recording so that trace logs may be complete.

BACKGROUND

Existing 3GPP systems, including 2G/3G systems and the newly emerging SAE/LTE system, support the possibility to trace a particular user throughout its lifetime in the network. Typical use of trace is to troubleshoot problematic user connections such as in response to user complaints. Another use is to monitor generic network performance and to perform root cause analysis to identify network problems.

The user may be traced based on the user identity (IMSI based trace), the terminal type (IMEI based trace) or based on location (cell trace). During tracing all network activities related to the particular user can be logged and later delivered to a network management entity for evaluation. Logged network activities include signaling messages sent and/or received either on the radio interface and/or on the network node interfaces. Details of the trace functionality may be found in documents "3GPP TS 32.421 Subscriber and equipment trace: Trace concepts and requirements," "3GPP TS 32.422 Subscriber and equipment trace: Trace control and configuration management," and "3GPP TS 32.423 Subscriber and equipment trace: Trace data definition and management."

The trace target and the trace configuration are specified by a management entity such as an OAM (Operation & Maintenance) entity, which sends the configuration to the involved network nodes. In the trace configuration there is possibility to specify the interface(s) from which the trace logs are to be collected as well. Also, the level of trace information details may be specified. For example, all message elements may be logged or only the most relevant ones may be logged.

In current 3GPP systems there are two ways to activate tracing, either via "signaling based activation" or "management based activation". In the signaling based activation, the trigger for tracing a particular user is propagated piggy-backed on the regular signaling messages sent between the network nodes which the given user flow passes through. Initially the management system configures the particular user for tracing in the HSS (Home Subscriber System) based on its IMSI (International Mobile Subscriber Identity). As soon as the user with the given IMSI appears in the system and the HSS is interrogated for user information such as security credentials at user attach, the trace trigger will be propagated to related network nodes via the invoked signaling flow.

In the management based activation, the trace trigger is not propagated to other nodes. Instead, the management system configures selected network nodes to trace a particular user or set of users. When a new user appears at the given network node, it evaluates the selection criteria and starts trace recording in case the criteria is satisfied.

A more recently studied use case of trace in 3GPP is the MDT (Minimization of Drive Test) measurements performed by the UE (user equipment). The MDT measurements are collected within the framework of the trace concept, where the UE is a trace entity itself that needs to be triggered for tracing just like any other network entity.

One problem with existing trace method is that there can be situations when the trace trigger reaches the involved network node such as the eNB (in case of LTE) or the UE (in case of the MDT measurements) only after the first UE messages have passed through the node or after the first messages has been sent from the UE. Thereby the initial messages of a UE connection cannot be registered, which means that the trace log will be incomplete and any network analysis or root cause analysis done later based on this information will be inaccurate and problematic. Due to the incompleteness of trace logs certain network problems may remain undiscovered by the management system.

SUMMARY

A non-limiting aspect of the disclosed subject matter is directed to a method performed by a trace entity for early trace recording in a mobile network. In the method, upon detection of invoking activity related to a user equipment, the trace entity invokes the trace data collection. At a predetermined point in time, the trace entity determines whether the tracing has been activated for the user equipment. If so, the trace entity continues the trace data collection. Otherwise, the trace entity stops the trace data collection. The trace entity invokes the trace data collection prior to determining whether or not the tracing has been activated.

Another non-limiting aspect of the disclosed subject matter is directed to a trace entity arranged to perform early trace recording in a mobile network. The trace entity comprises a message transceiving unit arranged to transmit and receive messages from nodes in the mobile network, a trace data collection unit arranged to perform trace data collection upon detection of an activity related to a user equipment, and a trace activation unit arranged to determine, at a predetermined point in time, whether tracing has been activated for the user equipment. The trace data collection unit is arranged to continue the trace data collection when it is determined that the tracing has been activated, and to stop the trace data collection when it is determined that the tracing has not been activated. The trace data collection is invoked in the trace data collection unit prior to the trace activation unit determining whether the tracing has been activated.

Yet another non-limiting aspect of the disclosed subject matter is directed to a mobile network that comprises one or more trace entities arranged to perform early trace recording. In the network, at least one trace entity is arranged invoke trace data collection upon detection of an activity related to a user equipment, determine at a predetermined point in time whether tracing has been activated for the user equipment, continue the trace data collection when it is determined that the tracing has been activated, and stop the trace data collection when it is determined that the tracing has not been activated. The trace entity is arranged to invoke the trace data collection prior to determining whether the tracing has been activated.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
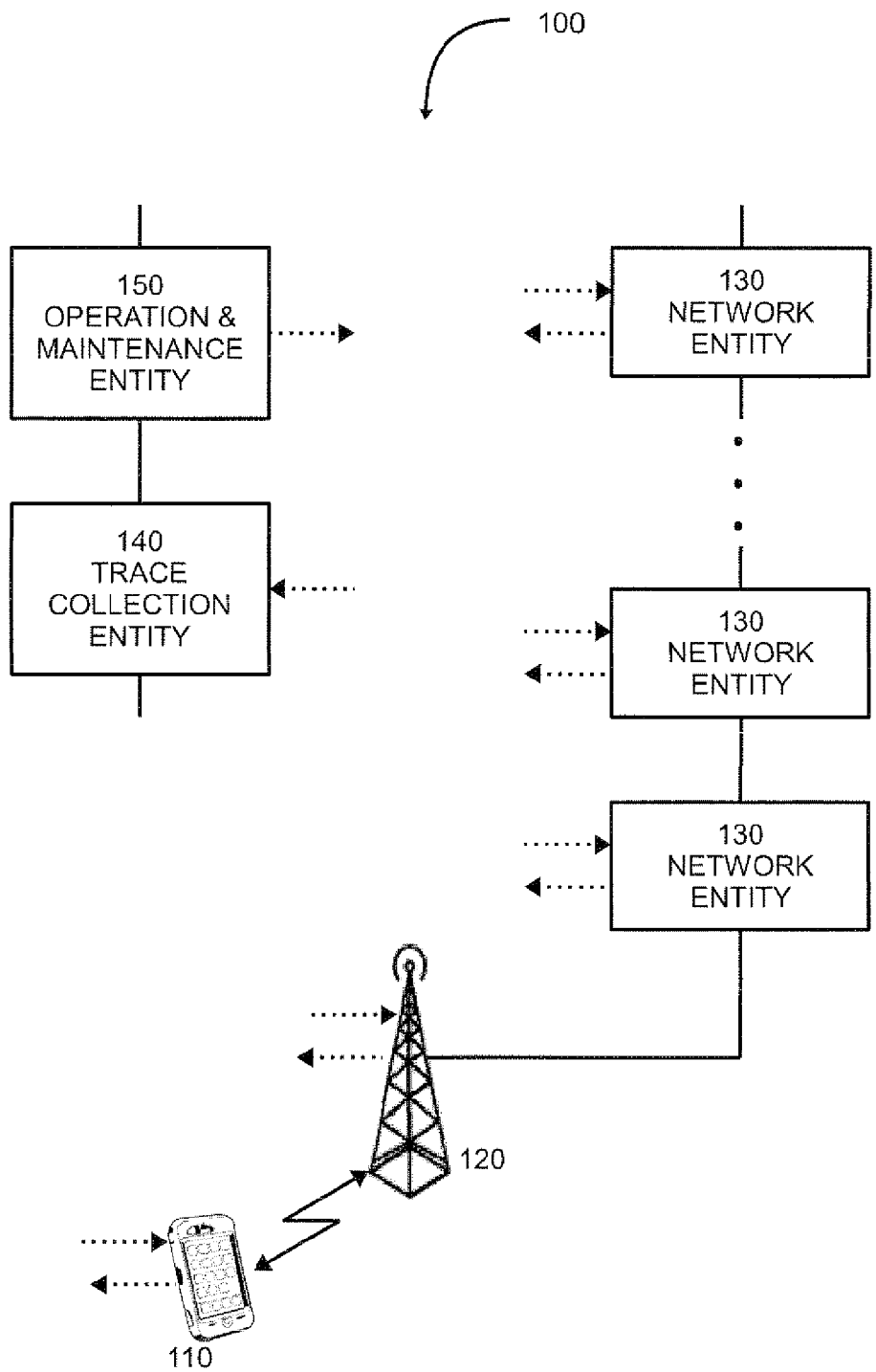
FIG. 1 illustrates a non-limiting example of a mobile network in which early trace recording can be performed.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to "RAM"), and non-volatile storage.

In this document, 3GPP is primarily used as examples for explanation purposes. However, the scope of this disclosure is not limited to the set of 3GPP wireless network systems and can encompass many domains of wireless network systems.

As noted in the background section, a problem with the existing tracing method is the incompleteness of tracing. As a result, certain network problems may remain undiscovered. To address some or all problems and difficulties associated with the existing tracing method, an "early trace recording" method is proposed in a non-limiting aspect. In this method, a network node or the UE starts recording trace data immediately when any initial activity related to the UE is detected and stores the logged information temporarily until the need for trace is confirmed by an explicit notification. If the recording entity receives a regular trace trigger related to the particular UE context later on, the entity continues with the trace data collection. Otherwise, the entity may stop tracing and discard temporarily stored trace data. The decision point to continue or stop tracing may be made at a predetermined point in the signaling sequence. The predetermined point can differ for each recording entity.

FIG. 1 illustrates a non-limiting example of a mobile network in which early trace recording can be performed. The mobile network 100 includes a base station 120, which is a network entity (NE), arranged to wirelessly communicate with a UE 110. The base station 120 is assumed to be early trace recording capable. The network 100 also includes one or more other network entities (NE) 130 also capable of early trace recording. Non-exhaustive examples of such network entities 130 include a radio network controller (RNC) and a serving CPRS support node (SGSN), a mobility management entity (MME), and home subscriber system (HSS) among others. Note that the UE 110 may also be early trace recording capable. In this document, any entity that is early trace recording capable is generically referred to as a "trace entity." Also note that the trace entities starting from the UE 110 to the base station 120 to the network entities 130 are in a signal path.

The network 100 may further include an operation & maintenance (OAM) entity 150 and a trace collection entity 140. The operation 86 maintenance entity 150 is arranged to configure tracing for a particular UE context to some or all trace entities 110, 120, 130 in the network 100. The trace collection entity 140 is arranged to collect the trace data recorded by the trace entities 110, 120, 130. The dashed arrows indicate that communications take place between the trace entities 110, 120, 130 and the trace collection entity 140 and the operation & maintenance entity 150.

It should be noted that FIG. 1 is a logical view in that the entities shown need not exactly correspond physically one-to-one with actual implementation. For example, the trace collection entity 140 and the operation 86 maintenance entity 150 may be implemented as a single physical module. As another example, the functions performed by any of the entities may be implemented over several physical modules.

Figure 2:
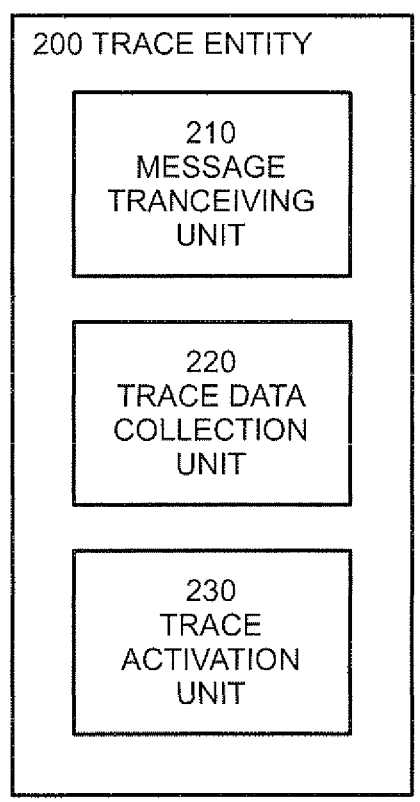
FIG. 2 illustrates a non-limiting configuration of a trace entity capable of performing early trace recording.

FIG. 2 illustrates a non-limiting configuration of the trace entity capable of performing early trace recording. The trace entity 200 includes a message transceiving unit 210, a trace data collection unit 220, and a trace data collection unit 230. The message transceiving unit 210 is arranged to transmit and receive messages from nodes in the mobile network 100. The trace data collection unit 220 is arranged to perform trace data collection upon detection of an activity related to a UE 110. The trace activation 230 unit arranged to determine, at a predetermined point in time, whether the tracing has been activated for the UE 110. The functions performed by the units will be explained in further detail later in this document.

Note that FIG. 2 is also a logical view. It is not strictly necessary that each unit be implemented as a physically separate module. Some or all units may be combined in a physical module. Moreover, the units need not be implemented strictly in hardware. It is contemplated that the units can be implemented through a combination of hardware and software. For example, the actual trace entity 200 may include one or more central processing units executing program instructions stored in a non-transitory computer readable medium or firmware to perform the functions of the units illustrated in the figure.

Figure 3:
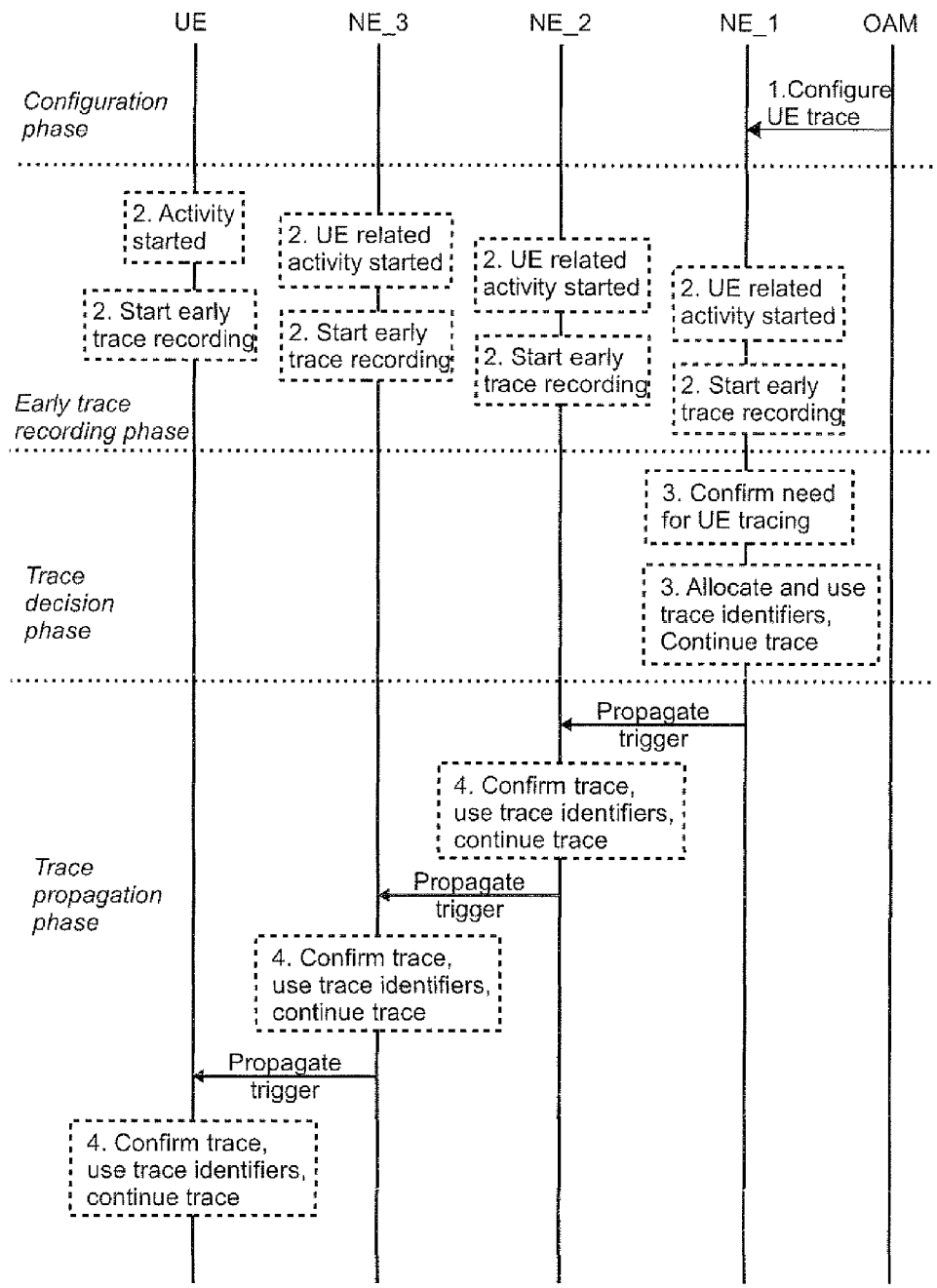
FIG. 3 illustrates a non-limiting example of a signaling sequence between involved trace entities in early trace recording in a mobile network.

FIG. 3 illustrates a non-limiting example of a signaling sequence between the involved trace entities in early trace recording in the network 100. In the figure, the involved trace entities are first, second, and third network entities NE_1, NE_2, and NE_3 and the UE. It is assumed that a signaling path exists between the UE and the first network entity NE_1 via the intermediate second and third network entities NE_2 and NE_3. The signaling direction from the UE to NE_1 will be considered to be upstream, and the direction from NE_1 to UE will be considered to be downstream.

Initially, the OAM entity configures tracing for a particular UE context in NE_1. NE_1, upon having the tracing configured, performs early trace recording to record activities related to the UE started in NE_1. That is, NE_1 invokes trace collection upon detection of activities related to the UE occurring in NE_1. NE_1 also originates a trace trigger for tracing of the UE related activities in the network, and propagates the trace trigger to other involved trace entities when the UE related activities appear at NE_1. Typically, the network entity where the trace is configured and from which the trace trigger may originate is the entity that can identify the UE IMSI/IMEI identities e.g., by authentication at initial attach.

Thus, tracing may be said to be activated for the UE at NE_1 when it is confirmed that the tracing requirements set forth in the tracing configuration are met by the UE. For example, the tracing configuration may specify a UE associated with a particular subscriber, may specify a UE of a particular type, may specify a particular base station to which a UE is in a radio connection, and so on. Note that NE_1 invokes the trace data collection prior to determining whether the tracing has been activated.

As the trace trigger originating network entity, NE_1 allocates trace identifiers and associates any UE related trace data collected thus far with the trace identifiers such as a trace session reference and a trace recording session reference among others. NE_1 also associates future trace data related to the UE it collects with the trace identifiers. When the UE related trace data are associated with the trace identifiers, the trace data can be correlated with UE related trace data collected at other trace entities and reported to the trace collection entity.

Conversely, if the tracing is not activated for the UE in NE_1, i.e. the UE does not meet the tracing requirements, then NE_1 can discard the trace data related to the UE collected thus far. Note that NE_1 may determine whether or not the tracing is activated at a predetermined point in time.

NE_1 propagates the trace trigger related to the UE in a trigger propagation message to a downstream network entity, which in this example is NE_2. The trace identifiers are also included in the trigger propagation message. NE_1 can piggy-back the trigger propagation message on other signaling messages it uses for other purposes such as signaling messages used to establish data connectivity with the UE. NE_1 can also use dedicated signaling messages specifically for propagation.

The second network entity NE_2, which is downstream of NE_1, performs early trace recording to record activities related to the UE started in NE_2. That is, NE_2 invokes trace collection upon detection of activities related to the UE occurring in NE_2. In a typical network entity, a network entity (NE) message received from a downstream network entity will be the detected activity that invokes the early trace recording in the network entity. For example, NE_2 may be a mobility management entity that receives a UE related message from an eNodeB, which sends the UE related message in response an RRC connection request from the UE.

When tracing is activated in NE_2, it continues the trace data collection. Since NE_2 is not the trace trigger originating network entity, the mechanism for determining whether the tracing is activated for the UE in NE_2 is different than in NE_1. As noted above, NE_1 propagates the trace trigger related to the UE in the trigger propagation message. When NE_2 receives the trigger propagation message that includes the trace trigger related from NE_1, it can be said that the tracing is activated in NE_2 for the UE. Again, note that in NE_2, the trace data collection is invoked prior to determining whether the tracing has been activated.

Conversely, if the trace trigger is not received, NE_2 determines that the tracing is not activated and discards the trace data related to the UE collected thus far. NE_2 may determine whether or not the tracing is activated at a predetermined point in time. For example, NE_2 may wait for a predetermined amount of time to receive the trace trigger from NE_1 after sending a UE related message to NE_1.

When the tracing is activated, NE_2 associates any UE related trace data collected thus far with the trace identifiers included in the trigger propagation message. Any future trace data collected related to the UE are also associated with the trace identifiers. NE_2 can propagate the trace trigger related to the UE and the trace identifiers in a trigger propagation message to a further downstream network entity, which in this example is NE_3. NE_2 can piggy-back the trigger propagation message on signaling messages used by NE_2 for other purposes such or may use dedicated signaling messages.

The third network entity NE_3 is much like NE_2 in that NE_3 is also an intermediate network entity in the signaling path between the UE and the trace trigger originating entity NE_1. NE_3 performs early trace recording to record activities related to the UE started in NE_3. That is, NE_3 invokes trace collection upon detection of activities related to the UE occurring in NE_3. But in this instance, the detected activity that invokes the trace data recording is a UE message received from the UE. For example, NE_3 may be an eNodeB receiving a random access message from the UE when the UE enters the coverage area of the eNodeB.

When the tracing is activated, NE_3 continues the trace data collection. When NE_3 receives the trigger propagation message that includes the trace trigger related to the UE from NE_2, NE_3 determines that the tracing is activated in NE_3 for the UE. The trace data collection is invoked in NE_3 prior to determining whether the tracing has been activated.

Conversely, if the trace trigger is not received, NE_3 determine that the tracing is not activated for the UE, at which point, it may discard the trace data related to the UE collected thus far. The NE_3 may determine whether or not the tracing is activated at a predetermined point in time. For example, NE_3 may wait for a predetermined amount of time to receive the trace trigger from NE_2 after sending a UE related message to NE_2.

NE_3 associates any UE related trace data collected thus far with the trace identifiers included in the trigger propagation message when the tracing is activated, and any future trace data collected related to the UE are also associated with the trace identifiers. NE_3 may propagate the trace trigger and the trace identifiers in a trigger propagation message to its downstream trace entity, which in this example is the UE. NE_3 can piggy-back the trigger propagation message on signaling messages used by NE_3 for other purposes such or may use dedicated signaling messages.

It is seen that when the trace entity is a network entity (e.g. NE_3), the detected activity that invokes the trace data collection at the network entity can be a UE message initiated by the UE to the mobile network.

It is also seen that when the trace entity is a network entity (e.g. NE_2), the detected activity can be a NE message related to the UE received from a downstream network entity (e.g. NE_3). The NE message can be sent from the downstream network entity in response to the downstream network entity receiving the UE message.

It is further seen that when the trace entity is a network entity (e.g. NE_1), the detected activity can be a NE message can be sent from the downstream network entity (e.g. NE_2) in response to the downstream network entity receiving another NE message from a further downstream network entity (e.g. NE_3), where the another NE message is related to the UE.

At the network entity, the trace data collection is invoked prior to the network entity sending the NE message to an upstream network entity. In this way, more comprehensive trace data may be collected which in turn allows for more accurate analysis to be performed.

The UE, like other trace entities, can invoke trace data collection upon detection of an activity related to the UE. However, the detected activity that invokes the trace data recording can be different for the UE than for the network entities such as NE_3 and NE_2. This is because the UE can initiate communication by sending a UE message to the mobile network. For example, when the UE enters a coverage area of a base station, it can initiate the random access process by sending a random access message. As another example, the UE can initiate a radio request connection by sending an initial RRC message to the base station. In a non-limiting aspect, UE invokes trace data collection prior to the UE initiating communication with the network, e.g., prior to the UE sending the UE message to NE_3. In this way, the trace data collection can be as comprehensive as possible.

When the UE receives the trigger propagation message that includes the trace trigger from NE_3, the UE can determine that tracing for the UE is activated, and the UE can continue the trace data collection. It bears repeating that the trace data collection is invoked in the UE prior to determining whether the tracing has been activated. When the tracing is activated, the UE associates the trace data collected thus far with the trace identifiers included in the trigger propagation message. One typical example where the UE is involved in the trace data collection is the use case of Minimization of Drive Test (MDT) measurements. In this case the UE may receive the trigger for doing MDT measurements in the form of an RRC (Radio Resource Control) protocol message, providing the MDT measurement configuration for the UE. When the RRC measurement configuration message is used to trigger the corresponding MDT measurement trace activity in the UE, the measurement identifier may be used to identify the trace activity instead of the trace identifiers. This means that the trace identifiers are not even sent to the UE and the translation between trace identifier and measurement identifier is done by the network (e.g., by the eNodeB).

Conversely, if the trace trigger is not received, NE_3 may determine that the tracing is not activated and discard the trace data collected thus far. The UE may determine whether or not the tracing is activated at a predetermined point in time. For example, after sending the UE message, the UE may wait for a predetermined amount of time to receive the trace trigger from NE_3.

Figure 4:
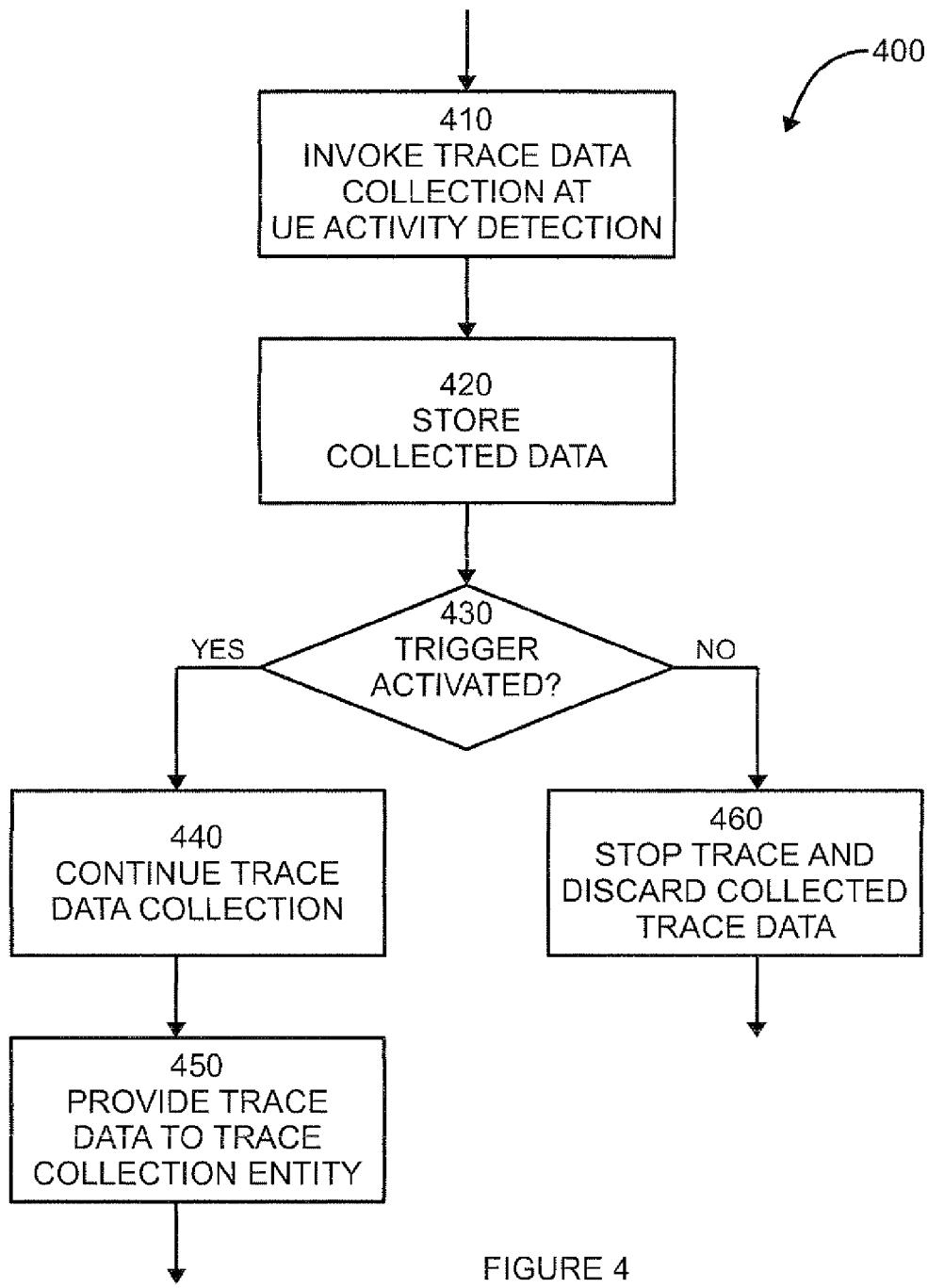
FIG. 4 illustrates a flow chart of a non-limiting example method performed at a trace entity for early trace recording in a mobile network.

FIG. 4 illustrates a flow chart of a non-limiting example method performed by the trace entity 200 for early trace recording in the mobile network 100. The method 400 is applicable to all trace entities. That is, any of the trace entities such as the UE 110 and the network entities 120, 130 may perform the method 400.

In step 410, the trace data collection performed by the trace data collection unit 220 is invoked upon detection of an activity related to the UE 110. When the trace entity 200 is a network entity 120 such as NE_3 that receives messages from the UE 110, the detected activity that invokes the trace data collection unit 220 can be a UE message from the UE 110 received by the message transceiving unit 210. The UE message may be a random access message or an initial RRC message.

When the trace entity 200 is a network entity 130 such as NE_2 or NE_1 that receives messages from a downstream network entity 120, 130, the detected activity that invokes the trace data collection unit 220 can be a NE message received by the message transceiving unit 210, where the NE message is related to the UE 110.

In step 420, the trace data collection unit 220 stores the collected trace data. In step 430, the trace activation unit 230 determines, at a predetermined point in time, whether tracing has been activated for the UE 110 in the trace entity 200. If so, then the trace data collection unit 220 continues the trace data collection in step 440, and in step 450, the message transceiving unit 210 provides the collected trace data to the trace collection entity 140. If the trace activation unit 230 determines that the tracing has not been activated in step 430, then in step 460, the trace data collection unit 220 can discard the collected trace data related to the UE.

In the method 400, the step 410 to invoke the trace data collection is performed at the trace entity 200 prior to the step 430 to determine whether the tracing has been activated.

As previously mentioned, the mechanism for determining whether the tracing is activated in step 430 can differ based on whether or not the trace entity 200 is a trace trigger originating entity. The mechanism for each will be described starting with the originating entity. In one aspect, the originating entity is the network entity 130 that can identify the UE 110 for tracing. For example, the originating entity 130 can identify the UE IMSI/IMEI identities by authentication at initial attach.

Figure 5:
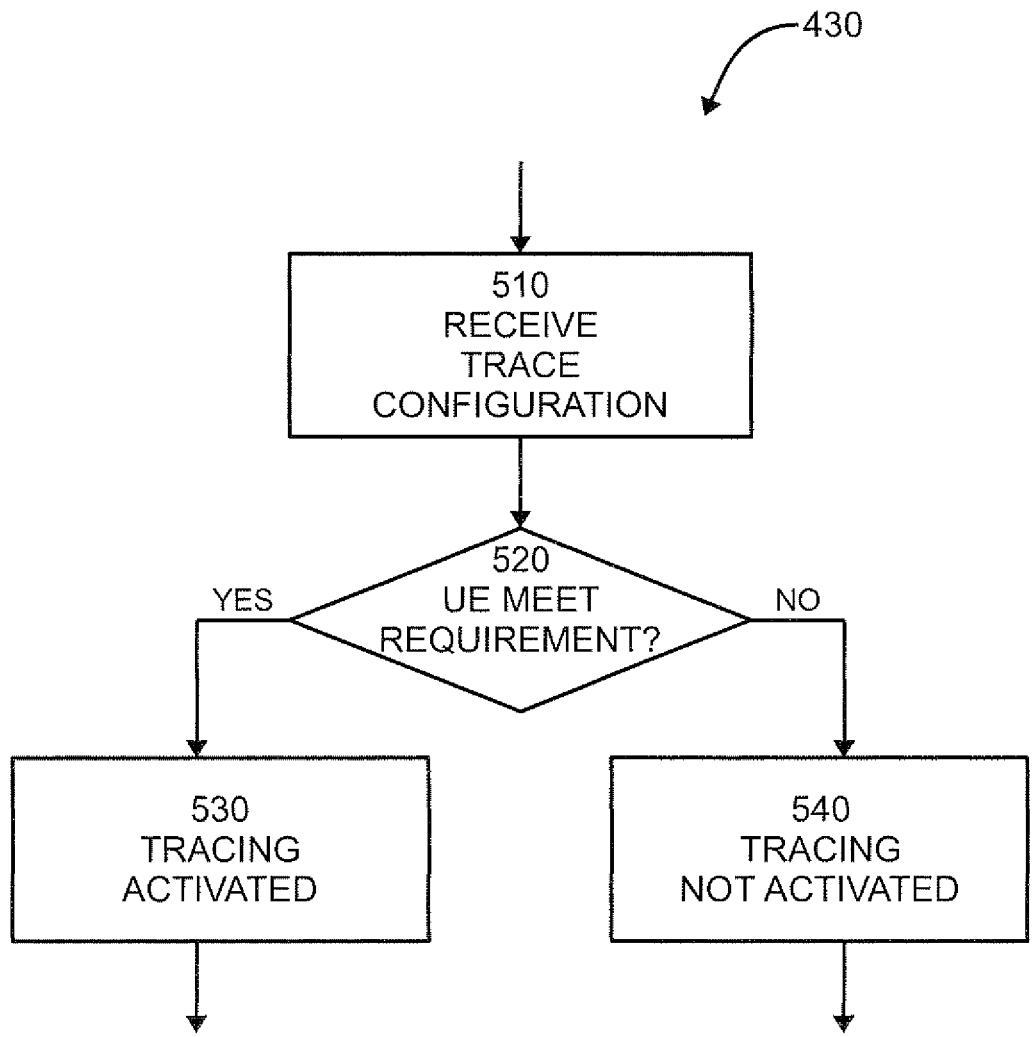
FIG. 5 illustrates a flow chart of a non-limiting example process performed at a trace trigger originating entity to determine whether the tracing is activated.

FIG. 5 illustrates a non-limiting example process of the step 430 to determine whether or not tracing for the UE is activated in the originating network entity 130. In step 510, the message transceiving unit 210 receives the trace configuration from the operation 86 management entity 150. The tracing for a particular UE context may be configured in the trace configuration. That is, the trace configuration may specify that activities related the UE 110 be traced when the UE is associated with a particular subscriber, the UE is of a particular type, the UE is connected to a particular base station of the network, and so on.

In step 520, the trace activation unit 230 confirms whether the UE 110 meets the tracing requirements set forth in the trace configuration. If confirmed, then in step 530, the tracing for the UE 110 is determined to be activated in the tracing entity 200. Otherwise, the tracing is not determined to be activated in step 540.

The originating entity 130 can be assumed to propagate the trace trigger to the involved downstream trace entities 110, 120, 130 in a trigger propagation message that includes trace identifiers. Referring back to FIG. 4, in the step 440 of continuing the trace data collection, the trace data collection entity 220 of the originating entity 130 associates the trace data collected thus far with the trace identifiers.

Figure 6:
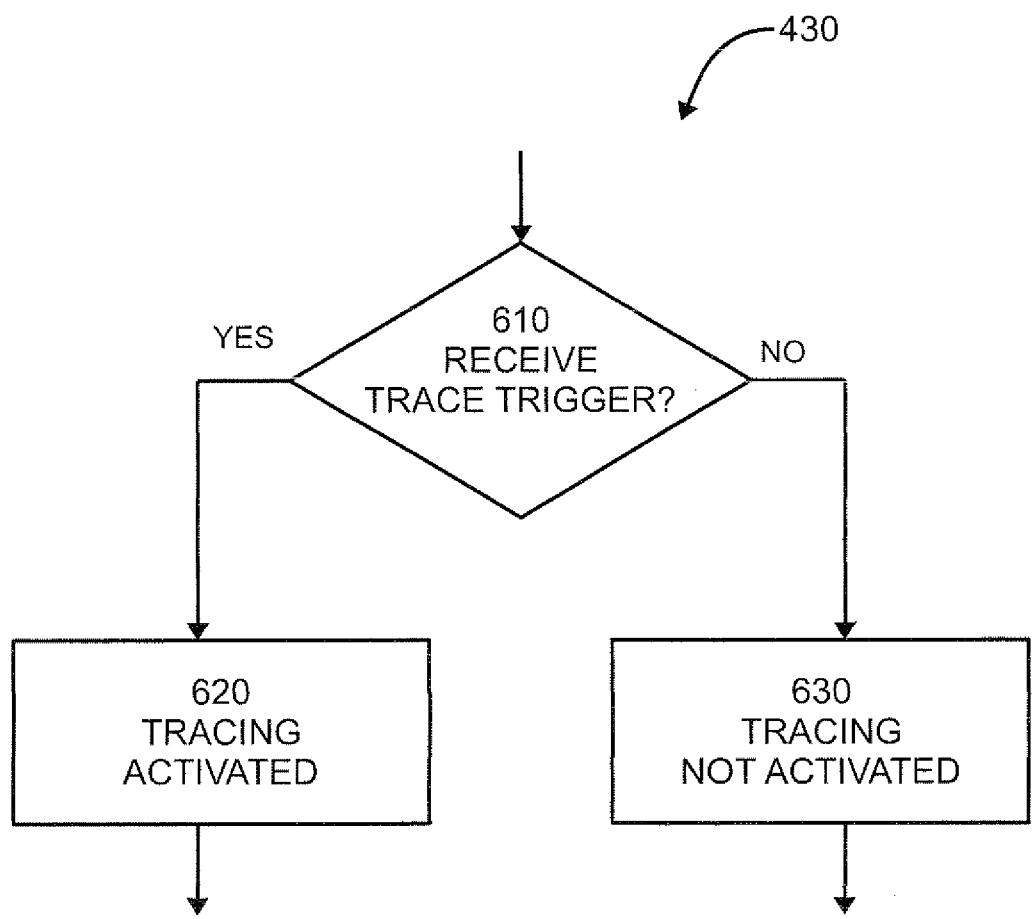
FIG. 6 illustrates a flow chart of a non-limiting example process performed at a trace entity other than the trace trigger originating entity to determine whether the tracing is activated.

FIG. 6 illustrates a non-limiting example process of the step 430 to determine whether or not tracing for the UE 110 is activated in the trace entity 200 when the trace entity 200 is not the originating entity, i.e. when the trace entity 200 is the UE 110 or one of the intermediate network entities 120, 130. In step 610, the trace activation unit 230 confirms that the trigger propagation message that includes the trace trigger related to the UE 100 is received from an upstream network entity 120, 130. If confirmed, then in step 620, the tracing is determined to be activated. Otherwise, the tracing is not determined to be activated in step 630.

Referring back to FIG. 4 again, in the step 440 of continuing the trace data collection, the trace data collection entity 220 of UE 110 or the intermediate entities 120, 130 associates the trace data collected thus far with the trace identifiers included in the trigger propagation message.

Figure 7:
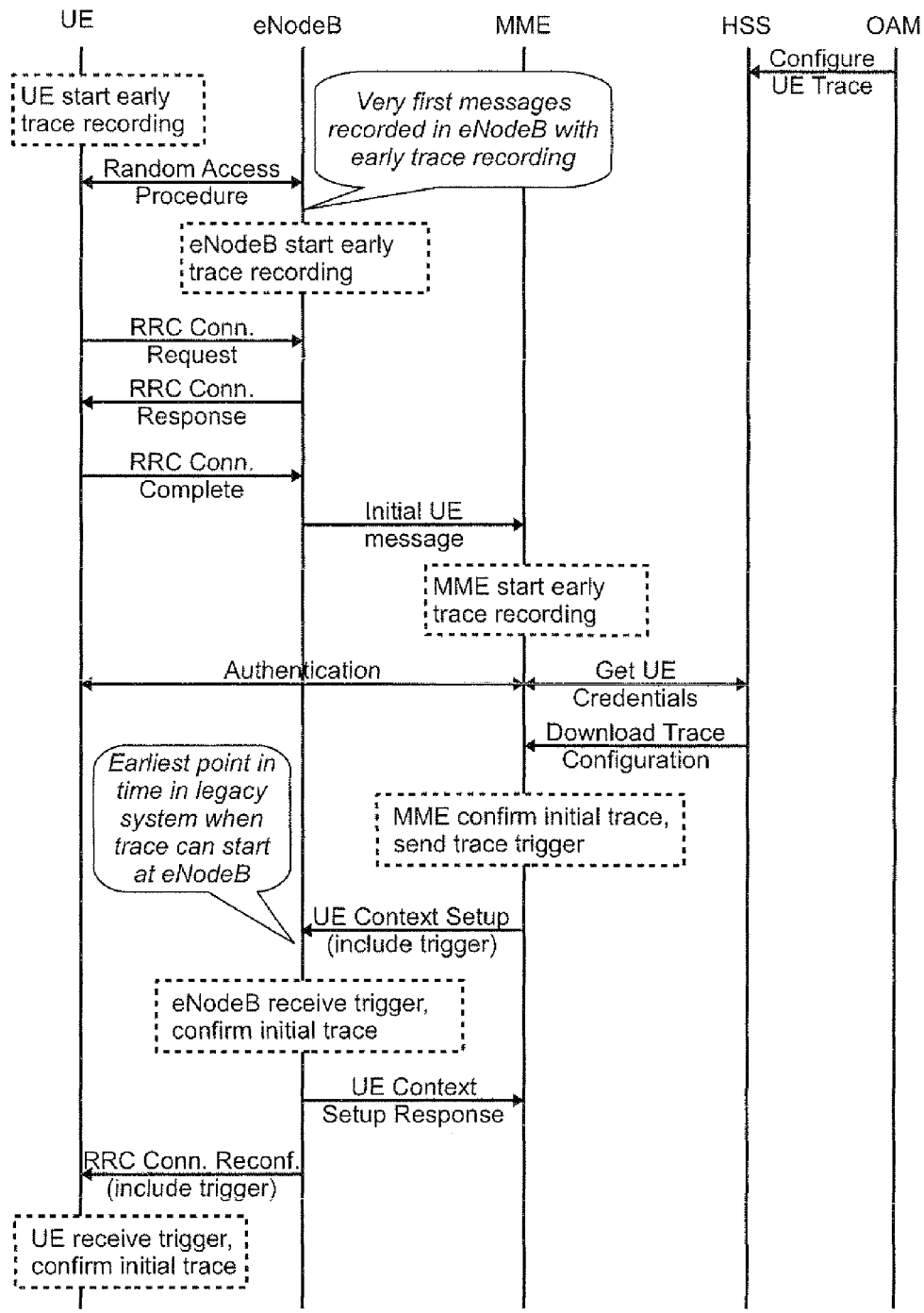
FIG. 7 illustrates a non-limiting example of a signaling sequence between involved trace entities in early trace recording in LTE.

A non-limiting implementation of the early trace recording is described in conjunction with FIG. 7 which illustrates an example signaling sequence in a LTE network between the UE, eNodeB, and MME. Note that it is not necessary that UE, eNodeB, and MME all be involved. The particular trace configuration determines which interfaces and nodes need to be traced. However, the described process is applicable even when any of the UE, eNodeB, and MME entities are omitted from the trace. Moreover, the described process remains applicable in cases when more entities, in addition to the illustrated MME, eNodeB and UE, are involved in the trace, which can be for instance, S/PCSCF entity in the service network. Further, the described process is applicable to systems other than LTE such as WCDMA.

Initially, the OAM entity configures the UE tracing in the HSS as shown in FIG. 7. Alternatively, the OAM can configure the trace in the MME directly. Before the UE starts any activity toward the eNodeB, it invokes the trace data collection. In this way, the messages of the random access procedure can be logged, as well as, the RRC connection establishment messages.

The eNodeB invokes the trace data collection at detecting the first random access attempts from the UE, e.g. upon receiving the random access message from the UE. The MME invokes the trace data collection upon receiving the initial UE related message from the eNodeB, which includes the identity of the UE such as the UE's IMSI. Note that the MME becomes certain about the UE identity after a successful authentication is completed.

After successful authentication, the early trace is confirmed in the MME, i.e., it is determined that the tracing is activated in the MME. Also, the MME triggers tracing toward the eNodeB. In this example scenario, it is assumed that the trace configuration is downloaded from the HSS to the MME. That is, the MME is the trace trigger originating entity. At this point, the MME allocates the trace identifiers for the identification of the trace session, and propagates the identifiers with the signaling message. In this illustrated sequence, the MME sends the UE context setup message to the eNodeB, which includes the trigger and the identifiers for tracing.

Upon the UE context setup message, the early trace is confirmed in the eNodeB, i.e., it is determined that the tracing is activated in the eNodeB for the UE. The eNodeB continues with the trace data collection when the tracing is activated. The eNodeB associates the received trace identifiers with the trace data collected thus far, and use the identifiers in any later reporting of trace records to the trace collection entity.

Note that in the conventional tracing method, the receipt of the UE context setup message is the earliest point in time in which the trace data collection can start in the eNodeB. This means that without the described early trace recording solution, all previous messages would not be recorded, which in turn means that trace data collected is much less complete. The trace trigger is propagated to the UE from the eNodeB, for example, in a RRC Connection Reconf message that also includes the trace identifiers.

Upon the UE receiving the trace trigger and identifiers from the eNodeB in the form of an RRC measurement configuration message, the early trace is confirmed, i.e. it is determined that the tracing is activated in the UE, at which point, the UE continues with the tracing as specified in the received trace configuration. Again note that the described early trace recording process allows the messages sent/received by the UE prior to the UE receiving the trace trigger to be recorded, which is not possible with the conventional tracing method.

We note also that the same mechanism remains applicable also in cases where one or more of the described NEs or the UE itself is omitted from the trace propagation signaling path. For example, there might be trace configurations where the UE is not required to take part in the tracing, e.g., when no MDT measurement need be collected by the UE, in which case the signaling message of trace trigger is not sent to the UE.

The sequence illustrated in FIG. 7 is an example of the signaling based trace activation. But it should be noted that the early trace recording concept is applicable also for the management based trace activation in which the trace scope is limited to the particular trace entity that has been configured for tracing from OAM, i.e. no propagation to trace trigger to other nodes. In this instance, the recording is confined to the particular trace entity, which can invoke the trace data recording even before the actual trace trigger has been generated in the trace entity.

Figure 8:
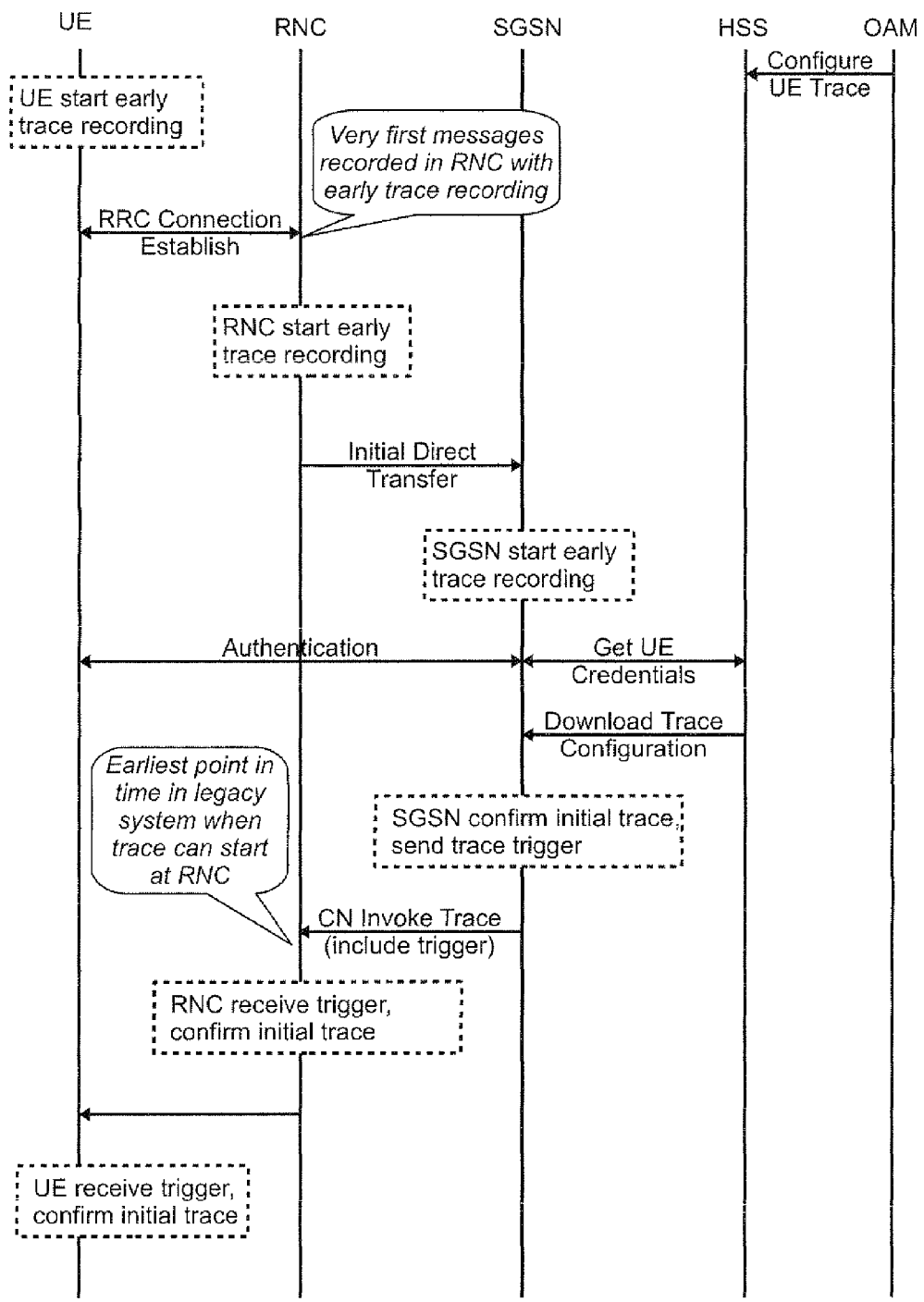
FIG. 8 illustrates a non-limiting example of a signaling sequence between involved trace entities in early trace recording in UTRAN.

Another non-limiting implementation of the early trace recording solution is described in conjunction with FIG. 8 which illustrates an example signaling sequence at UE attach in a UTRAN network. In this case, any of the UE, the RNC, and the SGSN may be involved. Initially, the OAM entity configures the UE tracing in the HSS. Alternatively, the OAM may configure the trace in the SGSN directly.

The UE invokes the trade data collection before it initiates the random access or the RRC connection establishment procedures. The RNC invokes the trace data collection at the reception of the first RRC message from the UE. Upon receiving the first RRC message, the RNC send a UE related message, e.g. the Initial Direct Transfer message, to the SGSN. The SGSN invokes the trace data collection upon receiving the first UE related message from the RNC. The SGSN obtains security credentials from the HSS and executes authentication with the UE.

After successful authentication, the early trace is confirmed in the SGSN. Similar to FIG. 7, it is assumed that the trace configuration is downloaded from the HSS to the SGSN. The SGSN allocates the trace identifiers, associate the trace data collected thus far with the allocated identifiers, and propagates the trigger and the identifiers in a CN invoke trace message to the RNC. Upon receiving this message, the RNC is confirmed for tracing of the UE. The RNC associates the trace data collected thus far with the identifiers received in the CN invoke trace message and continues tracing.

Note that in the legacy system, i.e., without the early trace recoding, this would be the earliest point in time when tracing for the UE could have been started in the RNC.

The RNC can further propagate the trigger and identifiers to the UE to allow the UE to confirm the tracing and to associate collected traced data with the identifiers.

The sequence illustrated in FIG. 8 is also an example of the signaling based trace activation. But it should be noted that the early trace recording concept is applicable also for the management based trace activation in which the trace scope is limited to the particular trace entity such as the RNC that has been configured for tracing directly from OAM. In this instance, the trace trigger may occur either in the RNC itself. In case the trace is IMEI based, the trace trigger may come from the SGSN with the CN invoke message since IMEI is available in the SGSN and not in the RNC.

There are important advantages to the described early trace recording procedure. For example, the early trace recording procedure allows the first activities, e.g. initial messages, related to a particular UE context to be recorded before a trace trigger is actually received. By recording the first messages of a UE connection, it becomes possible to extend the troubleshooting and performance monitoring activities to the initial part of the connection, where performance problems often occur. Without the early trace recording, it is not possible to detect network problems that occur during the initial phase of user connection establishment Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a trace entity of a mobile network for trace data collection in the mobile network, the method comprising:

starting, by the trace entity, the trace data collection upon detection of an activity related to a wireless user equipment (UE), the trace data collection comprising recording of trace data associated with signaling messages sent from and/or received at the trace entity, wherein the signaling messages are related to the wireless user equipment;

determining, by the trace entity, at a predetermined point in time after the trace data collection has started, whether tracing has been activated at the trace entity for the wireless user equipment, the tracing being activated at the trace entity for the wireless user equipment when the trace entity confirms that the wireless user equipment meets tracing requirements set forth in a trace configuration or when the trace entity receives a trace trigger related to the wireless user equipment from an upstream network entity;

continuing, by the trace entity, the trace data collection when it is determined that the tracing has been activated at the trace entity for the wireless user equipment; and stopping, by the trace entity, the trace data collection and discarding, by the trace entity, the recorded trace data collection when it is determined that the tracing has not been activated at the trace entity for the wireless user equipment, wherein the trace entity is a network entity of the mobile network or the wireless user equipment that can perform tracing, and wherein the trace data collection is started by the trace entity prior to the trace entity determining whether or not the tracing has been activated at the trace entity for the wireless user equipment and prior to the tracing being activated at the trace entity for the wireless user equipment.

2. The method of claim 1,
wherein the trace entity is the network entity,
wherein the detected activity that starts the trace data collection at the network entity is a UE message initiated by the wireless user equipment to the mobile network, or is a NE message related to the wireless user equipment from a downstream network entity, and
wherein the NE message is a message sent from the downstream network entity in response to the downstream network entity receiving the UE message, or is a message sent from the downstream network entity in response to the downstream network entity receiving another NE message related to the wireless user equipment from a further downstream network entity.

3. The method of claim 2, wherein the UE message is a random access message or an initial RRC message.

4. The method of claim 2, wherein the step of invoking the trace data collection is performed prior to the network entity sending the NE message to an upstream network entity.

5. The method of claim 4,
wherein the step of determining whether the tracing has been activated at the trace entity for the wireless user equipment comprises determining that the tracing has been activated at the network entity for the wireless user equipment when a trigger propagation message that includes the trace trigger related to the wireless user equipment is received from the upstream network entity, and
wherein the step of continuing the trace data collection comprises associating the trace data collected thus far at the network entity with trace identifiers included in the trigger propagation message.

6. The method of claim 2,
wherein the step of determining whether the tracing has been activated at the trace entity for the wireless user equipment comprises:
receiving the trace configuration from an operation & maintenance (OAM) entity; and
determining that the tracing has been activated at the network entity for the wireless user equipment when it is confirmed that the tracing requirements set forth in the trace configuration is met by the wireless user equipment, and
wherein the step of continuing the trace data collection comprises associating the trace data collected thus far at the network entity with trace identifiers.

7. The method of claim 1,
wherein the trace entity is the wireless user equipment, and
wherein the step of starting the trace data collection is performed prior to the wireless user equipment initiating a UE message to the mobile network.

8. The method of claim 7, wherein the UE message is a random access message or an initial RRC message.

9. The method of claim 7,
wherein the step of determining whether the tracing has been activated at the trace entity for the wireless user equipment comprises determining that the tracing has been activated at the wireless user equipment for the wireless user equipment when a trigger propagation message that includes a trace trigger related to the wireless user equipment is received from the mobile network, and
wherein the step of continuing the trace data collection comprises associating the trace data collected thus far at the wireless user equipment with trace identifiers or with measurement identifiers included in the trigger propagation message.

10. The method of claim 2,
wherein the network entity is a mobility management entity (MME),
wherein the downstream network entity is a base station and the NE message that starts the trace data collection at the mobility management entity is a UE related message sent from the base station in response to the base station receiving a random access message from the wireless user equipment, the UE related message including an identity of the wireless user equipment, and
wherein the step of starting the trace data collection is performed prior to the mobility management entity requesting credentials of the wireless user equipment from a home subscriber system (HSS).

11. The method of claim 10,
wherein the step of determining whether the tracing has been activated at the trace entity for the user equipment comprises:
  receiving a trace configuration from the home subscriber system; and
  determining that the tracing has been activated at the mobility management entity for the wireless user equipment when it is confirmed that tracing requirements set forth in the trace configuration is met by the wireless user equipment, and
wherein the step of continuing the trace data collection comprises associating the trace data collected thus far at the mobility management entity with trace identifiers.

12. The method of claim 2,
wherein the network entity is a base station,
wherein the UE message that starts the trace data collection at the base station is a random access message from the wireless user equipment, and
wherein the step of starting the trace data collection is performed prior to the base station sending a UE related message to a mobility management entity in response to the base station receiving the random access message from the wireless user equipment.

13. The method of claim 12,
wherein the step of determining whether the tracing has been activated at the trace entity for the wireless user equipment comprises:
  receiving a UE context setup message from a mobility management entity; and
  determining that the tracing has been activated at the base station for the wireless user equipment when a trace trigger for the wireless user equipment is included in the UE context setup message, and
wherein the step of continuing the trace data collection comprises associating the trace data collected thus far at the base station with trace identifiers included in the UE context setup message.

14. The method of claim 2,
wherein the network entity is a serving GPRS support node (SGSN),
wherein the downstream network entity is a radio network controller and the NE message that starts the trace data collection at the SGSN is an Initial Direct Transfer message sent from the radio network controller in response to the radio network controller receiving an RRC message from the wireless user equipment, and
wherein the step of starting the trace data collection is performed prior to the SGSN requesting credentials of the wireless user equipment from a home subscriber system (HSS).

15. The method of claim 14,
wherein the step of determining whether the tracing has been activated at the trace entity for the wireless user equipment comprises:
  receiving a trace configuration from the home subscriber system; and
  determining that the tracing has been activated at the SGSN for the wireless user equipment when it is confirmed that tracing requirements set forth in the trace configuration is met by the wireless user equipment, and
wherein the step of continuing the trace data collection comprises associating the trace data collected thus far at the SGSN with trace identifiers.

16. The method of claim 2,
wherein the network entity is a radio network controller,
wherein the UE message that starts the trace data collection at the radio network controller is an RRC message from the wireless user equipment, and
wherein the step of starting the trace data collection is performed prior to the radio network controller sending an Initial Direct Transfer message to an SGSN.

17. The method of claim 16,
wherein the step of determining whether the tracing has been activated at the trace entity for the wireless user equipment comprises:
  receiving a CN Invoke Trace message from the SGSN; and
  determining that the tracing has been activated at the radio network controller for the wireless user equipment when a trace trigger for the wireless user equipment is included in the CN Invoke Trace message, and
wherein the step of continuing the trace data collection comprises associating the trace data collected thus far at the radio network controller with trace identifiers included in the CN Invoke Trace message.

18. A trace entity of a mobile network arranged to perform data collection in the mobile network, the trace entity comprising:
  a message transceiving unit arranged to transmit and receive messages from nodes in the mobile network;
  a trace data collection unit arranged to start the trace data collection upon detection of an activity related to a wireless user equipment, the trace data collection comprising recording of trace data associated with signaling messages sent from and/or received at the trace entity, wherein the signaling messages are related to the wireless user equipment; and
  a trace activation unit arranged to determine, at a predetermined point in time after the trace data collection unit has started the trace data collection, whether tracing has been activated at the trace entity for the wireless user equipment, the tracing being activated at the trace entity for the wireless user equipment when it is confirmed that the wireless user equipment meets tracing requirements set forth in a trace configuration or when the message transceiving unit receives a trace trigger related to the wireless user equipment from an upstream network entity, wherein the trace data collection unit is arranged to continue the trace data collection when it is determined that the tracing has been activated at the trace entity for the wireless user equipment, and to stop the trace data collection and to discard the recorded trace data collection when it is determined that the tracing has not been activated at the trace entity for the wireless user equipment, and wherein the trace data collection unit is arranged to start the trace data collection prior to the trace activation unit determining whether or not the tracing has been activated at the trace entity for the wireless user equipment and prior to the tracing being activated at the trace entity for the wireless user equipment.

19. The trace entity of claim 18,
wherein the trace entity is a network entity,
wherein the detected activity that starts the trace data collection unit is a UE message initiated by the wireless user equipment to the mobile network, or is a NE message related to the wireless user equipment from a downstream network entity, and
wherein the NE message is a message sent from the downstream network entity in response to the downstream network entity receiving the UE message, or is a message sent from the downstream network entity in response to the downstream network entity receiving another NE message related to the wireless user equipment from a further downstream network entity.

20. The trace entity of claim 19, wherein the UE message is a random access message or an initial RRC message.

21. The trace entity of claim 19, wherein the trace data collection unit is arranged to start the trace data collection prior to the message transceiving unit sending the NE message to an upstream network entity.

22. The trace entity of claim 21,
wherein the trace activation unit is arranged to determine that the tracing has been activated at the network entity for the wireless user equipment when a trigger propagation message that includes a trace trigger related to the wireless user equipment is received by the message transceiving unit from the upstream network entity, and
wherein the a trace data collection unit is arranged to associate the trace data it has collected thus far with trace identifiers included in the trigger propagation message.

23. The trace entity of claim 19,
wherein the message transceiving unit is arranged to receive a trace configuration from an operation & maintenance entity,
wherein the trace activation unit is arranged determine that the tracing has been activated at the network entity for the wireless user equipment when it is confirmed that tracing requirements set forth in the trace configuration is met by the wireless user equipment, and
wherein the trace data collection unit is arranged to associate the trace data it has collected thus far with trace identifiers.

24. The trace entity of claim 18,
wherein the trace entity is the wireless user equipment, and
wherein the trace data collection unit is arranged to start the trace data collection prior to the message transceiving unit initiating a UE message to the mobile network.

25. The trace entity of claim 24, wherein the UE message is a random access message or an initial RRC message.

26. The trace entity of claim 24,
wherein the trace activation unit is arranged to determine that the tracing has been activated at the wireless user equipment for the wireless user equipment when a trigger propagation message that includes a trace trigger related to the wireless user equipment is received by the message transceiving unit from the mobile network, and
wherein the trace data collection unit is arranged to associate the trace data it has collected thus far with trace identifiers included in the trigger propagation message or with measurement identifiers included in the trigger propagation message.

27. A mobile network comprising one or more trace entities arranged to perform trace data collection, the one or more trace entities including a trace entity, wherein the trace entity is arranged to
start the trace data collection upon detection of an activity related to a wireless user equipment, the trace data collection comprising recording of trace data associated with signaling messages sent from and/or received at the trace entity, wherein the signaling messages are related to the wireless user equipment;
determine at a predetermined point in time after the trace data collection has started whether tracing has been activated at the trace entity for the wireless user equipment, the tracing being activated at that trace entity for the wireless user equipment when the trace entity confirms that the wireless user equipment meets tracing requirements set forth in a trace configuration or when the trace entity receives a trace trigger related to the wireless user equipment from an upstream network entity;
continue the trace data collection when it is determined that the tracing has been activated at the trace entity for the wireless user equipment; and
stop the trace data collection and discard the recorded trace data collection when it is determined that the tracing has not been activated at the trace entity for the wireless user equipment,
wherein the trace entity is arranged to start the trace data collection prior to the trace entity determining whether or not the tracing has been activated at the trace entity for the wireless user equipment and prior to the tracing being activated at the trace entity for the wireless user equipment.

28. The mobile network of claim 27,
wherein the trace entity is a network entity,
wherein the detected activity that starts the trace data collection at the network entity is a UE message initiated by the wireless user equipment to the mobile network, or is a NE message related to the wireless user equipment from a downstream network entity, and
wherein the NE message is a message sent from the downstream network entity in response to the downstream network entity receiving the UE message, or is a message sent from the downstream network entity in response to the downstream network entity receiving another NE message related to the wireless user equipment from a further downstream network entity.

29. The mobile network of claim 28, wherein the UE message is a random access message or an initial RRC message.

30. The mobile network of claim 28, wherein the network entity is arranged to start the trace data collection prior to sending the NE message to an upstream network entity.

31. The mobile network of claim 30, wherein the network entity is arranged to determine that the tracing has been activated at the network entity for the wireless user equipment when a trigger propagation message that includes a trace trigger related to the wireless user equipment is received from the upstream network entity, and associate the trace data collected thus far at the network entity with trace identifiers included in the trigger propagation message.

32. The mobile network of claim 28, wherein the network entity is arranged to receive a trace configuration from an operation & maintenance (OAM) entity, determine that the tracing has been activated at the network entity for the wireless user equipment when it is confirmed that tracing requirements set forth in the trace configuration is met by the wireless user equipment, and associate the trace data collected thus far at the network entity with trace identifiers.

33. The mobile network of claim 27, wherein the trace entity is the wireless user equipment arranged to start the trace data collection prior to initiating a UE message to the mobile network.

34. The mobile network of claim 33, wherein the UE message is a random access message or an initial RRC message.

35. The mobile network of claim 33, wherein the wireless user equipment is arranged to determine that the tracing has been activated at the wireless user equipment for the wireless user equipment when a trigger propagation message that includes a trace trigger related to the wireless user equipment is received from the mobile network, and associate the trace data collected thus far at the wireless user equipment with trace identifiers or with measurement identifiers included in the trigger propagation message.

36. The mobile network of claim 28, wherein the network entity is a mobility management entity, wherein the downstream network entity is a base station and the NE message that starts the trace data collection at the mobility management entity is an initial UE related message sent from the base station in response to the base station receiving a random access message from the wireless user equipment, the initial UE related message including an identity of the wireless user equipment, and wherein the mobility management entity is arranged to start the trace data collection prior to requesting credentials of the wireless user equipment from a home subscriber system (HSS).

37. The mobile network of claim 36, wherein the mobility management entity is arranged to receive a trace configuration from the home subscriber system, determine that the tracing has been activated at the mobility management entity for the wireless user equipment when it is confirmed that tracing requirements set forth in the trace configuration is met by the wireless user equipment, and associate the trace data collected thus far at the mobility management entity with trace identifiers.

38. The mobile network of claim 28, wherein the network entity is a base station, wherein the UE message that starts the trace data collection at the base station is a random access message from the wireless user equipment, and wherein the base station is arranged to start the trace data collection prior to sending an initial UE related message to a mobility management entity in response to the base station receiving the random access message from the wireless user equipment.

39. The mobile network of claim 38, wherein the base station is arranged to receive a UE context setup message from the mobility management entity, determine that the tracing has been activated at the base station for the wireless user equipment when a trace trigger for the wireless user equipment is included in the UE context setup message, and associate the trace data collected thus with trace identifiers included in the UE context setup message.

40. The mobile network of claim 28, wherein the network entity is a serving GPRS support node (SGSN), wherein the downstream network entity is a radio network controller and the NE message that starts the trace data collection at the SGSN is an Initial Direct Transfer message sent from the radio network controller in response to the radio network controller receiving an RRC message from the wireless user equipment, and wherein the SGSN is arranged to start the trace data collection prior to requesting credentials of the wireless user equipment from a home subscriber system.

41. The mobile network of claim 40, wherein the SGSN is arranged to receive a trace configuration from the home subscriber system, determine that the tracing has been activated at the SGSN for the wireless user equipment when it is confirmed that tracing requirements set forth in the trace configuration is met by the wireless user equipment, and associate the trace data collected thus far at the SGSN with trace identifiers.

42. The mobile network of claim 28, wherein the network entity is a radio network controller, wherein the UE message that starts the trace data collection at the radio network controller is an RRC message from the wireless user equipment, and wherein the trace data collection is started at the radio network controller to the radio network controller sending an Initial Direct Transfer message to an SGSN.

43. The mobile network of claim 42, wherein the radio network controller is arranged to receive a CN Invoke Trace message from the SGSN, determine that the tracing has been activated at the radio network controller for the wireless user equipment when a trace trigger for the wireless user equipment is included in the CN Invoke Trace message, and associate the trace data collected thus far at the radio network controller with trace identifiers included in the CN Invoke Trace message.

44. The method of claim 6, wherein the network entity is a trace trigger originating entity, and wherein the step of continuing the trace data collection further comprises allocating the trace identifiers used in the step of associating the trace data with the trace identifiers.

45. The trace entity of claim 23, wherein the network entity is a trace trigger originating entity, and wherein the trigger originating entity is arranged to allocate the trace identifiers used by the trace collection unit to associate the trace data with the trace identifiers.

46. The mobile network of claim 32, wherein the network entity is arranged to allocate the trace identifiers used to associate the trace data with the trace identifiers.

47. The trace entity of claim 18,
wherein the trace entity is the wireless user equipment,
wherein the message transceiving unit is arranged to
transmit a UE message to the mobile network, the UE message including an identity of the wireless user equipment, and
receive a trigger propagation message from the mobile network subsequent to transmitting the UE message,
wherein the trace activation unit is arranged to determine that the tracing has been activated at the trace entity for the wireless user equipment when it is confirmed that the trigger propagation message received from the mobile network includes a trace trigger related to the wireless user equipment, and
wherein the trace data collection unit is arranged to
start the trace data collection prior to the message transceiving unit transmitting the UE message to the mobile network, and
associate the trace data collected thus far at the wireless user equipment with trace identifiers and/or measurement identifiers included in the trigger propagation message when the trace activation unit determines that the tracing has been activated at the wireless user equipment for the wireless user equipment.

48. The trace entity of claim 18,
wherein the trace entity is a network entity,
wherein the message transceiving unit is arranged to
receive a UE message from the wireless user equipment, the UE message including an identity of the wireless user equipment,
transmit a NE message to an upstream network entity subsequent to receiving the UE message, the NE message including the identity of the wireless user equipment,
receive a trigger propagation message from the upstream network entity subsequent to transmitting the NE message, and
forward the trigger propagation message to the wireless user equipment subsequent to receiving the trigger propagation message when the trace activation unit determines that the tracing has been activated at the network entity for the wireless user equipment,
wherein the trace activation unit is arranged to determine that the tracing has been activated at the network entity for the wireless user equipment when it is confirmed that the trigger propagation message received from the upstream network entity includes a trace trigger related to the wireless user equipment, and
wherein the trace data collection unit is arranged to
start the trace data collection prior to the message transceiving unit transmitting the NE message to the upstream network entity, and
associate the trace data collected thus far at the network entity with trace identifiers included in the trigger propagation message when the trace activation unit determines that the tracing has been activated at at the network entity for the wireless user equipment.

49. The trace entity of claim 18,
wherein the trace entity is a network entity,
wherein the message transceiving unit is arranged to
receive a first NE message from a downstream network entity, the first NE message including an identity of the wireless user equipment,
transmit a second NE message to an upstream network entity subsequent to receiving the first NE message, the second NE message including the identity of the wireless user equipment,
receive a trigger propagation message from the upstream network entity subsequent to transmitting the second NE message, and
forward the trigger propagation message to the downstream network entity subsequent to receiving the trigger propagation message when the trace activation unit determines that the tracing has been activated at the network entity for the wireless user equipment,
wherein the trace activation unit is arranged to determine that the tracing has been activated at the network entity for the wireless user equipment when it is confirmed that the trigger propagation message received from the upstream network entity includes a trace trigger related to the wireless user equipment, and
wherein the trace data collection unit is arranged to
start the trace data collection prior to the message transceiving unit transmitting the second NE message to the upstream network entity, and
associate the trace data collected thus far at the network entity with trace identifiers included in the trigger propagation message when the trace activation unit determines that the tracing has been activated at the network entity for the wireless user equipment.

50. The trace entity of claim 18,
wherein the trace entity is a network entity,
wherein the message transceiving unit is arranged to
receive a trace configuration from a management entity,
receive a NE message from a downstream network entity, the NE message including an identity of the wireless user equipment, and
transmit a trace propagation message to the downstream network entity subsequent to receiving the NE message when the trace activation unit determines that the tracing has been activated at the network entity for the wireless user equipment, the trace propagation message including a trace trigger related to the wireless user equipment and trace identifiers,
wherein the trace activation unit is arranged to
determine that the tracing has been activated for the wireless user equipment when it is confirmed that the wireless user equipment meets tracing requirements set forth in the trace configuration, and
allocate the trace trigger and the trace identifiers when it is determined that the tracing has been activated at the network entity for the wireless user equipment, and
wherein the trace data collection unit is arranged to
start the trace data collection prior to the trace activation unit determining whether or not the tracing has been activated at the network entity for the wireless user equipment, and
associate the trace data collected thus far at the network entity with the trace identifiers when the trace activation unit determines that the tracing has been activated at the network entity for the wireless user equipment.

* * * * *

UNITED STATES PATENT AND TRADEMARK OFFICE
CERTIFICATE OF CORRECTION

| | | |
|---|---|---|
| PATENT NO. | : 8,787,901 B2 | Page 1 of 1 |
| APPLICATION NO. | : 12/899017 | |
| DATED | : July 22, 2014 | |
| INVENTOR(S) | : Racz et al. | |

It is certified that error appears in the above-identified patent and that said Letters Patent is hereby corrected as shown below:

In the Specification

In Column 4, Line 32, delete "CPRS" and insert -- GPRS --, therefor.

In Column 4, Line 41, delete "operation 86 maintenance" and insert -- operation & maintenance --, therefor.

In Column 4, Line 52, delete "operation 86 maintenance" and insert -- operation & maintenance --, therefor.

In Column 8, Line 55, delete "operation 86 management" and insert -- operation & management --, therefor.

In Column 9, Line 15, delete "UE 100" and insert -- UE 110 --, therefor.

In the Claims

In Column 13, Line 32, in Claim 11, delete "for the user" and insert -- for the wireless user --, therefor.

In Column 15, Line 48, in Claim 22, delete "the a trace" and insert -- the trace --, therefor.

In Column 19, Line 63, in Claim 48, delete "at at the" and insert -- at the --, therefor.

Signed and Sealed this
Twelfth Day of May, 2015

Michelle K. Lee
*Director of the United States Patent and Trademark Office*